H. Howson,
Boring Artesian Wells.
Nº 46,849. Patented Mar. 14, 1865.
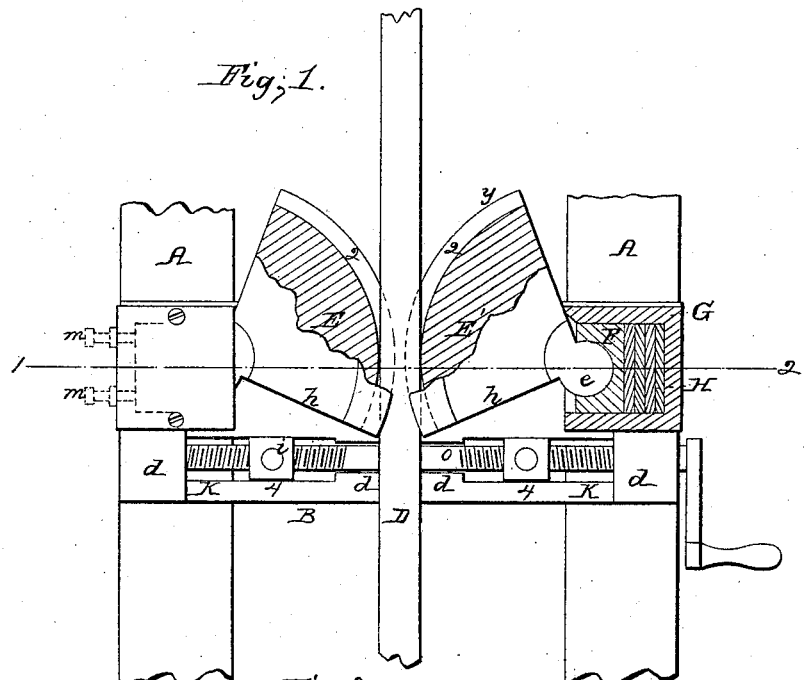
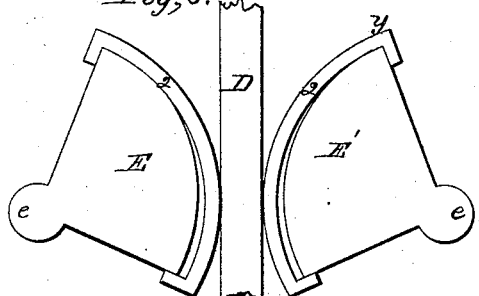
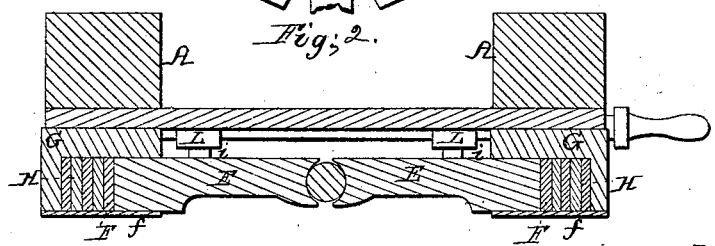
Witnesses:
Wm Albert Steel.
Inventor:
Henry Howson

UNITED STATES PATENT OFFICE.

HENRY HOWSON, OF PHILADELPHIA, PENNSYLVANIA, ASSIGNOR TO ROCK DRILL MANUFACTURING AND MINING COMPANY OF PENNSYLVANIA.

IMPROVEMENT IN WELL-BORING APPARATUS, &c.

Specification forming part of Letters Patent No. 46,849, dated March 14, 1865.

*To all whom it may concern:*

Be it known that I, HENRY HOWSON, of Philadelphia, Pennsylvania, have invented certain Mechanism for Controlling the Downward Velocity and Force of Well-Boring Rods; and I do hereby declare the following to be a full, clear, and exact description of the same, reference being had to the accompanying drawings, and to the letters of reference marked thereon.

My invention consists in the use, substantially in the manner described hereinafter, of cams or eccentrics, in combination with certain arresting devices or their equivalents for controlling the downward velocity and force of well-boring rods, and thereby preventing the injurious jars and lateral strains to which they are subjected when of great length and weight.

In order to enable others to make and use my invention, I will now proceed to describe its construction and operation.

On reference to the accompanying drawings, which form a part of this specification, Figure 1 is a front view of my device for controlling the effect of boring-rods, &c.; Fig. 2, a sectional plan on the line 1 2, Fig. 1, and Fig. 3 a modified form of cam or eccentric.

A A represent portions of two posts forming part of the frame-work or derrick used in boring oil or other Artesian wells, and to these posts, or to any other convenient part of the derrick, is secured a plate, B.

D is a portion of the cylindrical boring-rod, which may consist of the system of tubes described in the patent granted to Jesse N. Bolles, April 14, 1857, reissued December 20, 1864, the bar being raised and permitted to fall by any suitable system of gearing, or by the use of steam or pneumatic apparatus, the rod being guided so that it can move in a vertical direction only.

E and E' are two segmental cams or eccentrics, the peripheries of which are made to conform to the shape of the rod, as seen in Fig. 2, one cam bearing against one side and the other against the opposite of the rod D. The rounded end $e$, or, as it may be termed, the "journal" of each cam, is fitted snugly, but so as to move freely, in a recess of a block, F, which is arranged to slide to and fro in a box, G, the two boxes being secured to or forming a part of the plate B, and one or more strips, H, of gum-elastic or other suitable material intervening between the end of each box and the block F. The block, gum-elastic strips, and rounded portion of the cam are confined to the box and maintained in their proper lateral position by detachable plates $f$, Fig. 2.

Each cam or eccentric is so formed that the distance from the center on which it turns to the point $x$ of the periphery is less than the distance between the center and the point $y$ of the periphery; or, in other words, the distance from the center to the periphery gradually increases from the point $x$ to the pivot $y$.

The gum elastic or other equivalent springs are such as to maintain the peripheries of both cams always in contact with the rod D, so that as the latter rises both cams turn upward simultaneously on their centers, and downward when the rod is permitted to fall. If the downward movement of the cams be arrested while that of the rod is continued, the velocity and force of the falling rod will be abated by its friction against the cams, and this friction will vary according to the position occupied by the cams in relation to the rod, when the said cams are arrested, and according to the rigidity or elasticity of the springs in the boxes G. If the cams, when their downward motion is arrested, occupy the position illustrated in the drawings, the friction they impart to the boring-rod will be much less than if the cams are arrested when the points 2 2 of the peripheries of the cams are in contact with the rod. The force therefore with which the boring-tool at the end of the rod strikes the rock will depend upon the extent of the downward movement of the cams.

In the present instance the screw-shaft K and nuts L serve to regulate the extent of the downward movement of the cams, the shaft being arranged to turn in suitable bearings, $d$ $d$, on the plate A, and having left and right handed screw-threads, the left-handed threads controlling one nut and the right-handed threads the other, and the nuts moving in a slot or groove in the plate A. Each nut has a projecting pin, $i$, and with these pins the lower edges, $h$, of the cams come in contact on their descent. On turning the shaft in one direction the nuts will be moved simultaneously away from each other, and on turning it in a contrary direction they will approach each other.

In the above-mentioned boring machinery of Jesse N. Bolles the weight of the hollow boring-rod after it has reached a depth of from two hundred to three hundred feet is so great, and the force of the blow and the accompanying jar so excessive on releasing the rod, that the latter will spring and bend laterally, the joints thereby becoming so injured as to be rendered useless; hence the importance of some controlling medium by means of which the velocity of the boring-rod can be abated to an extent proportionate to its weight.

When the rod is short and comparatively light, the shaft is so turned that the nuts L will approach each other and occupy such a position that the cams will be arrested by the pins $i$ before the said cams have been moved downward with the rod to any great extent. When the arrest takes place, the rod will continue its downward movement, sliding between the peripheries of the cams, which, owing to their position, will impart but little friction.

When the rod is of great length and weight, the screw-shaft K is so turned that the nuts may be moved away from each other to a point which permits a more extended downward movement of the cams. On the release of the rod the cams will move with it until the latter are arrested by the pins $i$ at such a point that the rod must be tightly embraced by the peripheries of the two cams which impart such a friction to the rod as to abate its velocity and reduce the force with which the boring-tool would otherwise strike the rock. This checking of the velocity of the descending rod is not abrupt, but, owing to the springs H, so gentle that no detrimental jar can be communicated to the rod.

It will now be seen without further description that by the use of the cams or eccentrics and by the devices described or its equivalent for regulating the downward movement of the said cams, the attendant can have perfect control of the rod, and can regulate the velocity and force of its descent in proportion to its weight, thereby overcoming the difficulties which have heretofore attended the use of long and heavy rods in boring Artesian wells.

It will be advisable to provide means for regulating the rigidity and elasticity of the springs H, which can be easily done by the use of a plate at the end of each box and by set-screws $m$, bearing against the plate, as shown by dotted lines, Fig. 1. The springs may be dispensed with and the rounded ends or journals of the cams fitted to solid, unyielding bearings, in which case a strap may be attached to the cams, as seen in Fig. 3, a yielding packing intervening between the strap and the cam. I, however, prefer the use of the springs and yielding block, described above.

In order that the cams may move in unison with each other, they may be geared together.

It will be evident to any expert mechanic that devices other than the screw-shaft and nuts described above may be used to regulate the distance of the downward movement of the cams, and that the mechanism described may be modified in other respects without departing from the main features of my invention.

It will also be evident that my invention can be used in connection with the boring apparatus in which the tools are suspended from ropes, the rope in this case passing between and bearing against the cams.

The invention can also be applied to vertical hammers which are raised and permitted to fall.

I claim as my invention and desire to secure by Letters Patent—

The use, substantially in the manner described, of cams or eccentrics, in combination with the arresting devices herein described, or the equivalents to the same, for controlling the downward velocity and force of well-boring rods.

In testimony whereof I have signed my name to this specification in the presence of two subscribing witnesses.

HENRY HOWSON.

Witnesses:
CHARLES E. FOSTER,
ABRAHAM MOORE.